(12) United States Patent
Heo et al.

(10) Patent No.: US 11,836,978 B2
(45) Date of Patent: Dec. 5, 2023

(54) RELATED INFORMATION OUTPUT DEVICE

(71) Applicant: NTT DOCOMO, INC., Chiyoda-ku (JP)

(72) Inventors: Yoonok Heo, Chiyoda-ku (JP); Kevin Nguyen, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 196 days.

(21) Appl. No.: 17/433,888

(22) PCT Filed: Dec. 10, 2019

(86) PCT No.: PCT/JP2019/048348
§ 371 (c)(1),
(2) Date: Aug. 25, 2021

(87) PCT Pub. No.: WO2020/183826
PCT Pub. Date: Sep. 17, 2020

(65) Prior Publication Data
US 2022/0198794 A1    Jun. 23, 2022

(30) Foreign Application Priority Data
Mar. 8, 2019   (JP) ................................. 2019-042528

(51) Int. Cl.
*G06V 20/20* (2022.01)
*G06V 20/64* (2022.01)
(Continued)

(52) U.S. Cl.
CPC ......... *G06V 20/20* (2022.01); *G02B 27/0101* (2013.01); *G02B 27/0172* (2013.01);
(Continued)

(58) Field of Classification Search
CPC ........ G06V 20/20; G06V 20/64; G06V 20/35; G02B 27/0101; G02B 27/0172;
(Continued)

(56) References Cited

U.S. PATENT DOCUMENTS

| | | | |
|---|---|---|---|
| 2013/0083064 A1* | 4/2013 | Geisner | G06F 3/011 345/633 |
| 2016/0219165 A1* | 7/2016 | Iezaki | G03G 15/5016 |
| 2018/0322706 A1* | 11/2018 | Drouin | G06F 3/011 |

FOREIGN PATENT DOCUMENTS

| | | |
|---|---|---|
| JP | 2016-139168 A | 8/2016 |
| JP | 2018-97581 A | 6/2018 |
| JP | 2019-20841 A | 2/2019 |

OTHER PUBLICATIONS

Notice of Reasons for Refusal dated May 10, 2022 in Japanese Patent Application No. 2021-505519 (with English language translation), 8 pages.

(Continued)

*Primary Examiner* — Brent D Castiaux
(74) *Attorney, Agent, or Firm* — Oblon, McClelland, Maier & Neustadt, L.L.P.

(57) ABSTRACT

A related information output apparatus 1 includes an acquisition unit 10 that acquires a captured image, a recognition unit 12 that recognizes one or more objects included in the captured image acquired by the acquisition unit 10, and an output unit 13 that outputs related information related to the objects recognized by the recognition unit 12. The output unit 13 may output the related information based on a combination of a plurality of the objects recognized by the recognition unit 12.

7 Claims, 8 Drawing Sheets

| OBJECT 1 | | OBJECT 2 | | STATUS INFORMATION | RELATED INFORMATION |
|---|---|---|---|---|---|
| CATEGORY NAME | OBJECT NAME | CATEGORY NAME | OBJECT NAME | | |
| INGREDIENTS | PORK | INGREDIENTS | CARROT | MORNING | RECIPE OF SALAD USING PORK AND CARROT |
| INGREDIENTS | PORK | INGREDIENTS | CARROT | NIGHT | RECIPE OF BOILED FOOD USING PORK AND CARROT |
| VEHICLE | STEERING WHEEL | VEHICLE | ONCOMING VEHICLE | DRIVING | DO NOT DISPLAY |
| VEHICLE | STEERING WHEEL | ROAD | TRAFFIC LIGHT | PARKED LOCATION:•• | TRAFFIC JAM INFORMATION AHEAD |
| VEHICLE | DASHBOARD | VEHICLE | ONCOMING VEHICLE | DRIVING (ASSISTANT DRIVER'S SEAT) | SIGHTSEEING INFORMATION |
| FRENCH CUISINE | | CUTLERY | | HOME | DO NOT DISPLAY |
| FRENCH CUISINE | | CUTLERY | | RESTAURANT | TABLE MANNERS |

(51) Int. Cl.
*G02B 27/01* (2006.01)
*G06T 19/00* (2011.01)
(52) U.S. Cl.
CPC ........ *G02B 27/0179* (2013.01); *G06T 19/006* (2013.01); *G06V 20/64* (2022.01); *G02B 2027/014* (2013.01); *G02B 2027/0138* (2013.01); *G02B 2027/0178* (2013.01); *G02B 2027/0185* (2013.01)
(58) Field of Classification Search
CPC .............. G02B 27/0179; G02B 27/017; G02B 2027/0138; G02B 2027/014; G02B 2027/0178; G02B 2027/0185; G02B 2027/0141; G06T 19/006; G09G 3/001; G09G 5/377; G05F 3/01; G05F 16/538
See application file for complete search history.

(56) References Cited

OTHER PUBLICATIONS

International Search Report dated Mar. 3, 2020 in PCT/JP2019/048348 filed on Dec. 10, 2019 (2 pages).
International Preliminary Report on Patentability dated Sep. 23, 2021 in PCT/JP2019/048348, (submitting English translation only) 8 pages.

* cited by examiner

Fig. 3

| OBJECT 1 | | OBJECT 2 | | RELATED INFORMATION |
|---|---|---|---|---|
| CATEGORY NAME | OBJECT NAME | CATEGORY NAME | OBJECT NAME | |
| COOKWARE | CHOPPING BOARD | INGREDIENTS | CARROT | CARROT COOKING METHOD AND CORRESPONDING RECIPE |
| INGREDIENTS | PORK | INGREDIENTS | CARROT | RECIPE USING PORK AND CARROT |
| FRENCH CUISINE | | CUTLERY | | TABLE MANNERS |
| JAPANESE CUISINE | | SEASONING | MISO | SUGGEST OPTIMAL SEASONING |

Fig.4

| OBJECT | CATEGORY |
|---|---|
| ESCARGOT | FRENCH CUISINE |
| KNIFE | CUTLERY |
| TEMPURA | JAPANESE CUISINE |
| | |

Fig.5

| OBJECT 1 | | OBJECT 2 | | STATUS INFORMATION | RELATED INFORMATION |
|---|---|---|---|---|---|
| CATEGORY NAME | OBJECT NAME | CATEGORY NAME | OBJECT NAME | | |
| INGREDIENTS | PORK | INGREDIENTS | CARROT | MORNING | RECIPE OF SALAD USING PORK AND CARROT |
| INGREDIENTS | PORK | INGREDIENTS | CARROT | NIGHT | RECIPE OF BOILED FOOD USING PORK AND CARROT |
| VEHICLE | STEERING WHEEL | VEHICLE | ONCOMING VEHICLE | DRIVING | DO NOT DISPLAY |
| VEHICLE | STEERING WHEEL | ROAD | TRAFFIC LIGHT | PARKED LOCATION:** | TRAFFIC JAM INFORMATION AHEAD |
| VEHICLE | DASHBOARD | VEHICLE | ONCOMING VEHICLE | DRIVING (ASSISTANT DRIVER'S SEAT) | SIGHTSEEING INFORMATION |
| FRENCH CUISINE | | CUTLERY | | HOME | DO NOT DISPLAY |
| FRENCH CUISINE | | CUTLERY | | RESTAURANT | TABLE MANNERS |

RELATED INFORMATION OUTPUT DEVICE

RELATED INFORMATION OUTPUT DEVICE

Technical Field

An aspect of the present disclosure relates to a related information output apparatus that outputs related information related to objects included in a captured image.

Background Art

Patent Literature 1 as below discloses an information processing apparatus that recognizes objects photographed in a captured image captured by a camera.

CITATION LIST

Patent Literature

[Patent Literature 1] Japanese Unexamined Patent Publication No. 2019-020841

SUMMARY OF INVENTION

Technical Problem

However, this information processing apparatus has a problem that it is not convenient for users since related information related to objects photographed in the captured image is not output, for example.

Therefore, an aspect of the present disclosure has been made in view of the problems, and an object thereof is to provide a related information output apparatus capable of outputting related information related to objects included in a captured image.

Solution to Problem

In order to solve these problems, a related information output apparatus according to an aspect of the present disclosure comprises: an acquisition unit that acquires a captured image; a recognition unit that recognizes one or more objects comprised in the captured image acquired by the acquisition unit; and an output unit that outputs related information related to the objects recognized by the recognition unit.

According to the related information output apparatus, the one or more objects comprised in the captured image are recognized and the related information related to the recognized objects is output. That is, it is possible to output the related information related to the one or more objects comprised in the captured image.

Advantageous Effects of Invention

According to an aspect of the present disclosure, it is possible to output related information related to objects included in a captured image.

BRIEF DESCRIPTION OF DRAWINGS

FIG. 3 is a diagram illustrating an example of a correlation table.

FIG. 4 is a diagram illustrating an example of a table in which objects and categories are correlated with each other.

FIG. 5 is a diagram illustrating another example of the correlation table.

DESCRIPTION OF EMBODIMENTS

Hereinafter, a related information output apparatus 1 according to an embodiment of the present invention will be described in detail with reference to the accompanying drawings. In description with reference to the drawings, the same elements will be referred to by the same reference signs and redundant description thereof will be omitted. In the following description, the embodiments are specific examples of the present invention, and the present invention is not limited to these embodiments unless particularly stated otherwise.

The related information output apparatus 1 is a computer apparatus that implements augmented reality (AR) which is a technique of adding other information to information that a person can sense in the real world to augment and represent the reality, or mixed reality (MR) which is a technique of mixing a real space and a virtual space to construct a new space in which real and virtual objects influence each other in real-time. Although it is described in the present embodiment that the related information output apparatus 1 is smartglasses which are a head-mounted display (HMD)-type AR wearable device, there is no limitation thereto. For example, the related information output apparatus 1 may be an apparatus in which attachments are attached to an ordinary smartphone, and may be used in such a form that the apparatus is fixed to the face of a user with the aid of attachments.

Figure 1:
FIG. 1 is a diagram illustrating a configuration of a related information output apparatus according to an embodiment of the present invention.

FIG. 1 is a diagram illustrating a configuration of the related information output apparatus 1. As illustrated in FIG. 1, the related information output apparatus 1 includes a main apparatus 1a, an image capturing apparatus 1b, and a display apparatus 1c. As described above, the related information output apparatus 1 is smartglasses and is used in such a way that a user wears ordinary eyeglasses.

The main apparatus 1a is a computer system body and controls the processing of the entire related information output apparatus 1 such as controlling input and output of the image capturing apparatus 1b and the display apparatus 1c, receiving information from the image capturing apparatus 1b, performing arithmetic operations on the basis of the input information, and outputting information such as arithmetic results, instructions, and the like to the display apparatus 1c.

The main apparatus 1a may further include a position information acquisition device (not illustrated) that acquires position information (latitude, longitude, and the like) of the related information output apparatus 1 using a global positioning system (GPS) and the like. The position information acquisition device may acquire the position information using base station information from base stations of a mobile communication system rather than a GPS. The main apparatus 1a may further include an acceleration acquisition device (not illustrated) such as an acceleration sensor that acquires acceleration information related to acceleration of the related information output apparatus 1. The main apparatus 1a may further include a sight acquisition device (not illustrated) such as a sight sensor that acquires (detects) the sight information related to the line of sight (the viewed point) of a user wearing the related information output apparatus 1. The main apparatus 1a may further include a sound acquisition device (not illustrated) such as a microphone that acquires sound information related to sound around the related information output apparatus 1 and the voice of the user wearing the related information output apparatus 1.

The main apparatus 1a controls the processing of the position information acquisition device, the acceleration acquisition device, the sight acquisition device, and the sound acquisition device similarly to the image capturing apparatus 1b and the display apparatus 1c.

The image capturing apparatus 1b can capture an image of the surroundings of the related information output apparatus 1 or the surroundings of the user wearing the related information output apparatus 1 as a captured image (including a captured video) and is specifically a camera. The captured image is a joint photographic experts group (JPEG) image, for example. The captured video is a moving picture experts group (MPEG) video, for example. The related information output apparatus 1 includes the image capturing apparatus 1b facing outward (when seen from the user) and captures the same view as with the line of sight or view of the user.

The display apparatus 1c can display information to the user and is specifically a display. The display apparatus 1c is disposed at a position near the eyes of the user like the lenses of eyeglasses. The display apparatus 1c displays the captured image captured by the image capturing apparatus 1b to the user.

Figure 2:
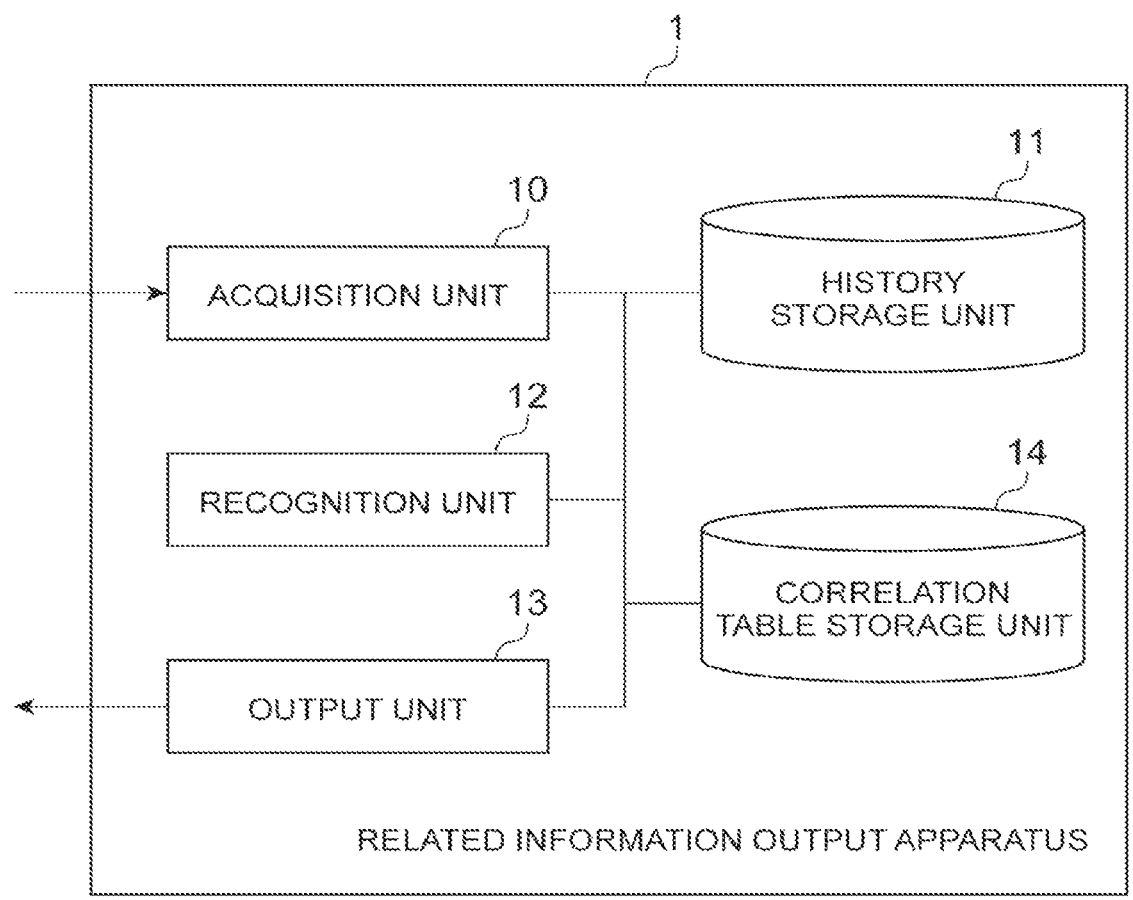
FIG. 2 is a functional block diagram of the related information output apparatus according to the embodiment of the present invention.

FIG. 2 is a functional block diagram of the related information output apparatus 1. As illustrated in FIG. 2, the related information output apparatus 1 includes an acquisition unit 10, a history storage unit 11, a recognition unit 12, an output unit 13, a correlation table storage unit 14, and an auxiliary information storage unit 15.

Although it is assumed that the functional blocks of the related information output apparatus 1 function within the main apparatus 1a, there is no limitation thereto. For example, the functional blocks (or some functional blocks) of the related information output apparatus 1 may function within a server apparatus network-connected to the eyeglasses apparatus, the server apparatus being different from an apparatus (for example, referred to as an eyeglasses apparatus) including the image capturing apparatus 1b and the display apparatus 1c while appropriately transmitting and receiving information to and from the eyeglasses apparatus. In this case, the server apparatus performs appropriate processing after determining an eyeglasses apparatus or a user on which the processing is to be performed by receiving identification information for identifying the eyeglasses apparatus or identification information for identifying the user of the eyeglasses apparatus from the eyeglasses apparatus. By providing some or all functional blocks in the server apparatus, it is possible to reduce a processing load and a storage capacity of the eyeglasses apparatus and manage data on the server apparatus in a centralized manner.

Hereinafter, the functional blocks of the related information output apparatus 1 illustrated in FIG. 2 will be described.

The acquisition unit 10 acquires a captured image. Specifically, the acquisition unit 10 acquires a captured image captured by the image capturing apparatus 1b. When acquiring the captured image, the acquisition unit 10 may acquire any one or more of position information when the image capturing apparatus 1b captured a captured image, timing information related to the time point at which a captured image was captured, acceleration information related to an acceleration when the image capturing apparatus 1b captured a captured image, sight information related to the line of sight of the user when the image capturing apparatus 1b captured a captured image, and sound information related to the surrounding sound and the user's voice when (for example, for one second before and after) the image capturing apparatus 1b captured a captured image. The timing information is any one of a time point, a time period, date and time, day of week, and date. The position information, the timing information, the acceleration information, the sight information, and the sound information are provided by the main apparatus 1a on the basis of the processing (known technique) of the main apparatus 1a. Various pieces of information acquired by the acquisition unit 10 are appropriately input to other functional blocks.

The history storage unit 11 stores various pieces of information acquired by the acquisition unit 10 as a history. For example, the history storage unit 11 stores any one or more of the captured image, the position information, the timing information, the acceleration information, the sight information, and the sound information acquired (at the same timing) by the acquisition unit 10 in correlation with the time point at which they are acquired by the acquisition unit 10. The history stored in the history storage unit 11 is appropriately referred to by other functional blocks.

The recognition unit 12 recognizes (one or more) objects included in the captured image acquired by the acquisition unit 10. An object is a target object (including a person and the like), and for example, is a person, a tree, a carrot, pork, a pepper, a refrigerator, a kitchen knife, a chopping board, chopsticks, a knife, a steering wheel, a dashboard (of a vehicle), an oncoming vehicle, and a traffic light. Recognition of objects by the recognition unit 12 uses an ordinary object recognition technique. For example, an object recognition technique implemented in an open source computer vision library (OpenCV) which is an open source library may be used. The recognition unit 12 outputs a recognition result (information on the recognized objects) to the output unit 13. An example of the recognition result is information indicating which object is disposed at which position of the captured image.

The output unit 13 outputs related information related to the objects recognized by the recognition unit 12 on the basis of the recognition result input from the recognition unit 12. The details of the processing method of the related information related to the objects by the output unit 13 will be described later. The related information may be arbitrary information as long as it is information related to objects, and for example, is information indicating a cooking method (of objects), a recipe (using objects), information indicating an eating method (manners) (of objects), information indicating a destination (of objects), and attention information (for the user of the related information output apparatus 1 based on objects). The output of the related information by the output unit 13 may be display and may be output (transmission) to other apparatuses. For example, the output unit 13 may display the related information so as to be superimposed on the captured image displayed to the user by the display apparatus 1c. Specifically, the output unit 13 transmits instruction information to the display apparatus 1c so that the related information is displayed by being superimposed on the captured image, and the display apparatus 1c displays the related information so as to be superimposed on the captured image displayed to the user on the basis of the transmission.

Hereinafter, the details of various processing methods of the related information related to objects by the output unit 13 will be described. The processing methods to be described later can be used in combination with another one or more processing methods.

[Processing Method 1]

The output unit 13 may output related information based on a combination of a plurality of objects recognized by the recognition unit 12. Specifically, the output unit 13 extracts related information correlated with a plurality of objects recognized by the recognition unit 12 in a correlation table stored in the correlation table storage unit 14 and outputs the extracted related information. The correlation table is table data in which one or more objects are correlated with related information. FIG. 3 is a diagram illustrating an example of the correlation table. In the table example illustrated in FIG. 3, two objects ("Object 1" and "Object 2") are correlated with related information. "Category name" of each object indicates the category (attribute) of the object. The category name will be used in a processing method to be described later. "Object name" of each object indicates an identification name of the object. In the present embodiment, for the sake of convenience, it is assumed that the recognition result obtained by the recognition unit 12 includes an object name of an object. "Related information" indicates related information. In the present embodiment, although "related information" is text indicating (describing) the entity of related information for the sake of convenience, it should be read such that the entity of related information is used in actual processing.

In the table example illustrated in FIG. 3, a first record indicates that an object having an object name of "chopping board" and an object having an object name of "carrot" are correlated with related information "carrot cooking method and corresponding recipe". For example, when the first object name among the two objects recognized by the recognition unit 12 is "chopping board" and the second object name is "carrot", the output unit 13 selects the first record as a record correlated with the object name "chopping board" and the object name "carrot" in the table example of the correlation table illustrated in FIG. 3 and extracts and outputs the related information "carrot cooking method and corresponding recipe" correlated with the first record. In this way, the user wearing the related information output apparatus 1 can view a cooking method of carrot and the corresponding recipe on the display apparatus 1c when the user places a carrot on a chopping board. Although two objects are correlated in the table example illustrated in FIG. 3, the output unit 13 performs a similar extraction process also when one or three or more objects are correlated.

[Processing Method 2]

The output unit 13 may select an object group from the plurality of objects recognized by the recognition unit 12 and (preferentially) output related information based on a combination of objects included in the selected object group.

[Processing Method 2-1]

The output unit 13 may select an object group on the basis of an attribute of objects. In the following description, although a category (kind, type, or class) is used as the attribute as an example, there is no limitation thereto. As a specific example of the category, as illustrated in FIG. 3, the category of "chopping board" is "cookware", the category of "pork" and "carrot" is "ingredients", and the category of "miso" is "seasoning".

For example, the output unit 13 may determine the categories of each object, select objects having the same category as an object group from the plurality of objects recognized by the recognition unit 12, and (preferentially) output related information based on a combination of objects included in the selected object group. In this way, the output unit 13 can select an object group including objects (for example, "meat" and "carrot") of the category "ingredients" and (preferentially) output a recipe as the related information.

For example, the output unit 13 may determine the category of each object, select objects having different categories as an object group from the plurality of objects recognized by the recognition unit 12, and (preferentially) output related information based on a combination of objects included in the selected object group. In this way, the output unit 13 can select an object group including an object (for example, "carrot") of the category "ingredients" and an object (for example, "kitchen knife") of the category "cookware" and (preferentially) output a cooking method as the related information.

The determination of the category of objects by the output unit 13 is performed by referring to the table data (stored in the correlation table storage unit 14) in which objects and categories are correlated with each other in advance as in the table example illustrated in FIG. 4, for example. Moreover, when the number of elements of the object group selected by a first criterion (for example, the "same category" described above) is smaller than a prescribed threshold (number of combinations of the object group is smaller than a prescribed threshold), the output unit 13 may lower a selection priority of the first criterion so that the object group selected by a second criterion (for example, the "different categories" described above) different from the first criterion is employed (preferentially).

[Processing Method 2-2]

The output unit 13 may select the object group on the basis of the distance between objects. For example, the output unit 13 may select objects gathering within a prescribed distance from the plurality of objects recognized by the recognition unit 12 as an object group and (preferentially) output related information based on a combination of the objects included in the selected object group. For example, when a "chopping board", "kitchen knife", and "carrot" are gathered nearby (within a prescribed distance) and "meat" and "pepper" are at relatively distant locations (further than the prescribed distance), the output unit 13 may select the gathered former objects as an object group. The degree of gathering may be determined by the number of (recognized) objects. A priority (of outputting of related information) may be set according to the degree of gathering.

[Processing Method 2-3]

The output unit 13 may select an object group on the basis of the distance to the user. For example, the output unit 13 may recognize the body of the user such as the hands from a plurality of objects recognized by the recognition unit 12, select objects present around the recognized body as an object group, and (preferentially) output related information based on a combination of objects included in the selected object group. Recognition of the body of the user by the output unit 13 is performed on the basis of an ordinary image recognition technique of captured images acquired by the acquisition unit 10.

[Processing Method 2-4]

The output unit 13 may select the object group on the basis of the line of sight (the viewed point or the direction of the line of sight) of the user. For example, the output unit 13 may recognize the line of sight of the user in a plurality of objects recognized by the recognition unit 12, select objects present near the viewed point (within a prescribed distance from) of the recognized line of sight as an object group, and (preferentially) output related information based on a combination of the objects included in the selected object group. Recognition of the line of sight of the user by the output unit 13 is performed on the basis of the sight information acquired by the acquisition unit 10.

[Processing Method 3]

When objects are combined, the output unit 13 may use attributes of objects as at least a part of elements of the combination instead of the objects. Specifically, when correlation is referred to in the correlation table described in Processing method 1, when a corresponding object is not present in the correlation table, the output unit 13 identifies a category of the object, and refers to a correlation (combination) of the identified category instead of the object. For example, when a correlation between an object name "A" of Object 1 and an object name "B" of Object 2 is referred to in a correlation table, and a corresponding record is not present, a correlation between a category name "Cat-A" of Object 1 and an object name "B" of Object 2 is referred to. If the corresponding record is not present, a correlation between an object name "A" of Object 1 and a category name "Cat-B" of Object 2 may be referred to. If the corresponding record is not present, a correlation between a category name "Cat-A" of Object 1 and a category name "Cat-B" of Object 2 may be referred to. The categories may have a hierarchical structure, and the layers may be scanned in order from the lower layer until a correlation is found.

In this way, for example, the output unit 13 can output related information related to an eating method or manners on the basis of a combination between "cuisine" which is a category and "chopsticks" or "knife" which is an object. Moreover, for example, the output unit 13 can output related information related to the choice of optimal seasoning on the basis of a combination between "Japanese cuisine" which is a category and a plurality of "seasoning" objects.

[Processing Method 4]

The output unit 13 may output related information on the basis of at least one of the position information when the image capturing apparatus 1b captured the captured image acquired by the acquisition unit 10, the timing information related to the time point at which the captured image was captured, the status information related to the status when the captured image was captured, and related information output in the past by the output unit 13.

[Processing Method 4-1]

The output unit 13 may output related information on the basis of the position information (the position information acquired by the acquisition unit 10) when the image capturing apparatus 1b captured the captured image acquired by the acquisition unit 10. In this way, for example, for the same combination of the category "cuisine" and the object "cutlery", the output unit 13 can output manners information in the case of eating-out (when the position information (registered in advance) indicates a place other than the home) without outputting related information in the case of the home (the position information indicates the home).

[Processing Method 4-2]

The output unit 13 may output related information on the basis of timing information (the timing information acquired by the acquisition unit 10) related to the time point at which the captured image acquired by the acquisition unit 10 was captured. In this way, the output unit 13 can suggest optimal recipes for the same ingredient combination so that different recipes are output for the morning and the night.

[Processing Method 4-3]

The output unit 13 may output related information on the basis of the status information related to the status (context) when the captured image acquired by the acquisition unit 10 was captured. A specific example of the status information will be described with reference to FIG. 5. FIG. 5 is a diagram illustrating another example of a correlation table different from the example of the correlation table illustrated in FIG. 4. In the table example illustrated in FIG. 5, "status information" is further correlated with respect to the table example illustrated in FIG. 4. As illustrated in FIG. 5, specific examples of the status information include "morning", "night", "driving", "parked (including a parking location)", "driving (user is sitting on an assistant driver's seat)", "home", and "restaurant". That is, the status information may include position information and timing information. For example, when the first object name among the two objects recognized by the recognition unit 12 is "dashboard", and the second object name is "oncoming vehicle", and the status information is "driving (assistant driver's seat)", the output unit 13 selects a fifth record as a record correlated with the object name "dashboard", the object name "oncoming vehicle", and the status information "driving (assistant driver's seat)" in the example of the correlation table illustrated in FIG. 5 and extracts and outputs related information "sightseeing information" correlated with the fifth record.

The output unit 13 may calculate status information on the basis of at least one of the captured image acquired by the acquisition unit 10, the position information (the position information acquired by the acquisition unit 10) when the image capturing apparatus 1b captured the captured image, the timing information (the timing information acquired by the acquisition unit 10) related to the time point at which the captured image was captured, the acceleration information acquired by the acquisition unit 10, the sight information acquired by the acquisition unit 10, and the sound information acquired by the acquisition unit 10.

For example, the output unit 13 may identify change over time in the captured image (and the history of the captured image stored in the history storage unit 11) acquired by the acquisition unit 10 and calculate the status information on the basis of the degree of change. Moreover, for example, when a steering wheel and an oncoming vehicle are recognized in the captured image, the output unit 13 may determine that the user is in a vehicle, determine that the user is driving on the basis of the change in (degree of) the size of the oncoming vehicle, and calculate the status information indicating the status. Furthermore, for example, when a dashboard and an oncoming vehicle are recognized in the captured image, the output unit 13 may determine that the user is in a vehicle or on an assistant driver's seat, determine that the vehicle is traveling on the basis of the change in (degree of) the size of an oncoming vehicle, and calculate status information indicating the status. Furthermore, for example, when a road is recognized in the captured image, the position information indicates a sidewalk, and the speed of the user is detected on the basis of the acceleration information acquired by the acquisition unit 10, the output unit 13 may determine that the user is walking and calculate status information indicating the status. Status information based on the other information is calculated similarly.

According to the above, for example, the output unit 13 can output related information to a user sitting on an assistant driver's seat of a driving vehicle on the basis of the status information without outputting related information to the user driving a vehicle (since the related information may disturb driving of a driver and should not be output).

[Processing Method 4-4]

The output unit 13 may output related information on the basis of related information output in the past by the output unit 13. It is assumed that the output unit 13 can store the related information output in the past by the output unit 13 in the history storage unit 11 and refer to the past related information appropriately. For example, for the same object combination, if related information has been output in the past on the basis of the combination, the output unit 13 may not output the same related information again.

[Processing Method 5]

The output unit 13 may change the timing to output related information, the related information to be output, or a display area for displaying the related information on the basis of at least one of the position information (the position information acquired by the acquisition unit 10) when the image capturing apparatus 1b captured the captured image acquired by the acquisition unit 10, the timing information (the timing information acquired by the acquisition unit 10) related to the time point at which the captured image was captured, the acceleration information acquired by the acquisition unit 10, the sight information acquired by the acquisition unit 10, the sound information acquired by the acquisition unit 10, the status information related to the status when the captured image was captured, and the related information output in the past by the output unit 13. For example, as an example of changing the timing to output the related information on the basis of the status information, the related information may be output at a timing at which a vehicle stops when the user is driving the vehicle. Moreover, for example, as an example of changing the related information to be output on the basis of the status information, the content of the related information to be output may be simplified and output when the user is driving. Furthermore, for example, as an example of changing the display area for displaying the related information on the basis of the status information, the related information may be displayed at the center of the view of the user when the user is sitting on an assistant driver's seat of a traveling vehicle, and the related information may be displayed in an area where the related information does not disturb walking when the user is walking. Changing based on information other than the status information is performed similarly.

[Processing Method 6]

The output unit 13 may change the content of the related information to be output according to the prescribed priority. The contact to be changed may be determined in advance. For example, the output unit 13 may display the details of the related information using a relatively large region when the set priority is high and display the overview of the related information in a relatively small region when the set priority is low.

[Processing Method 7]

The output unit 13 may output related information based on the other information stored in advance in the related information output apparatus 1. For example, the output unit 13 may output information on ingredients stored in a refrigerator of a house additionally as the related information.

Figure 6:
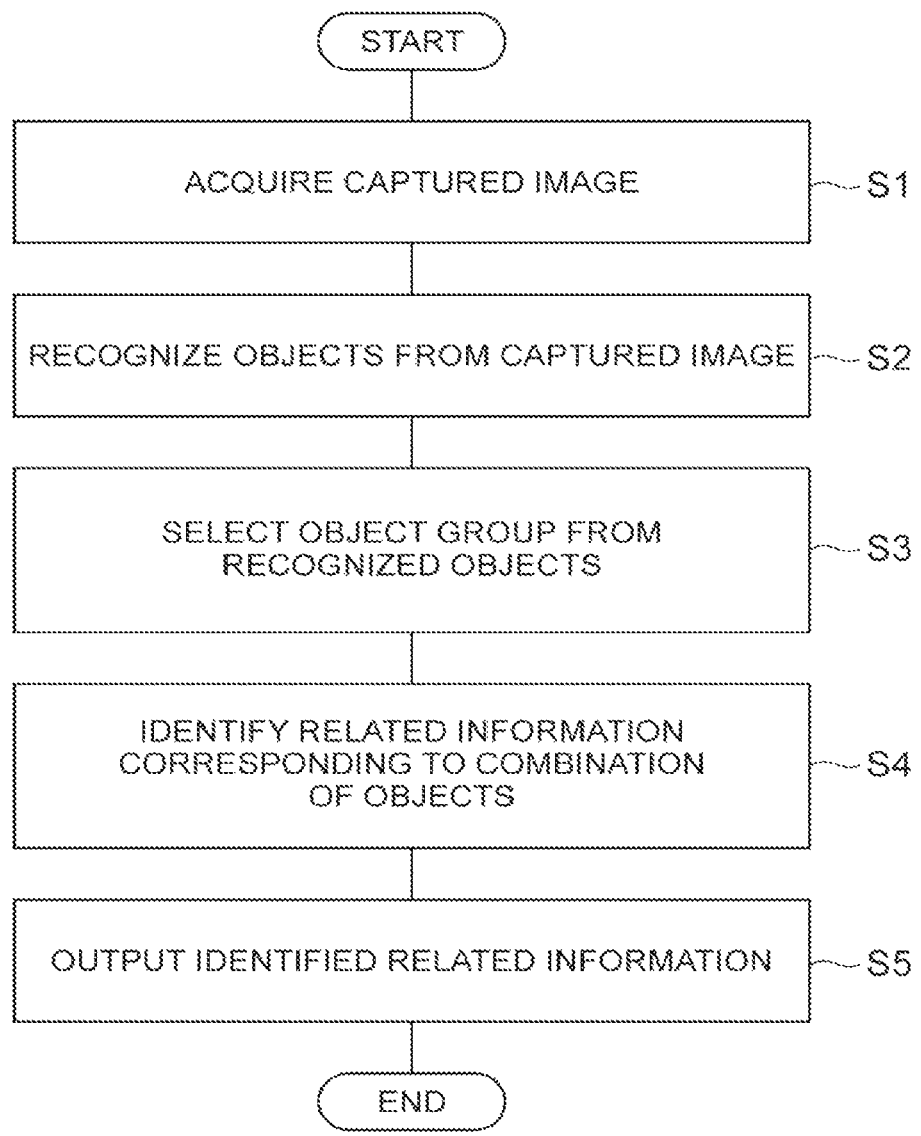
FIG. 6 is a flowchart illustrating an example of a related information output process executed by the related information output apparatus according to the embodiment of the present invention.

Next, an example of a related information output process executed by the related information output apparatus 1 will be described with reference to the flowchart illustrated in FIG. 6.

First, the acquisition unit 10 acquires a captured image (step S1).

Subsequently, the recognition unit 12 recognizes objects from the captured image acquired in S1 (step S2). Subsequently, the output unit 13 selects an object group from the objects recognized in S2 (step S3). Subsequently, the output unit 13 identifies related information corresponding to a combination of objects included in the object group selected in S3 (step S4). Subsequently, the output unit 13 outputs the related information identified in S4 (step S5). S3 can be omitted, and in that case, the related information corresponding to a combination of the objects recognized in S2 is identified in S4.

Figure 7:
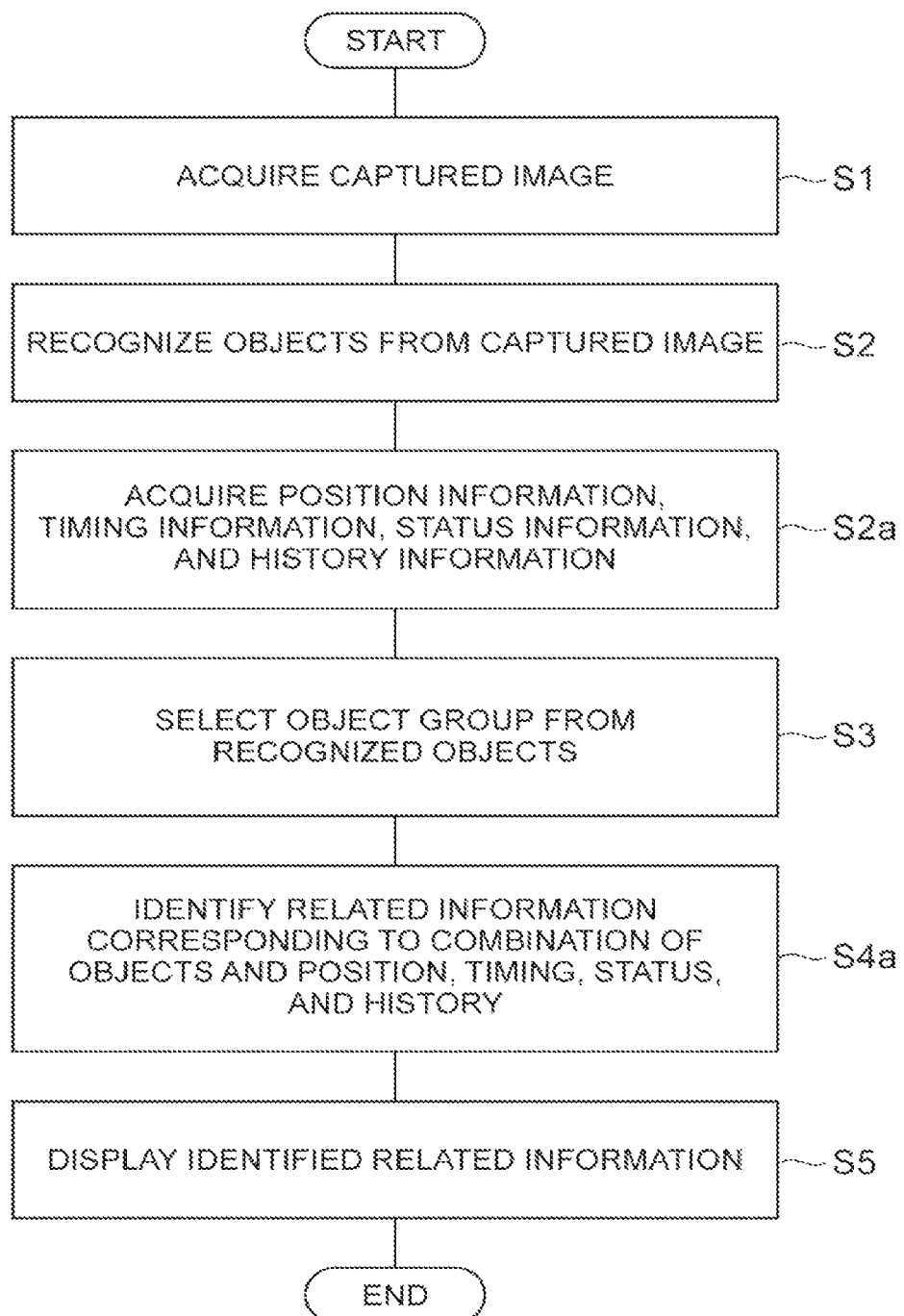
FIG. 7 is a flowchart illustrating another example of the related information output process executed by the related information output apparatus according to the embodiment of the present invention.

Next, another example of the related information output process executed by the related information output apparatus 1 will be described with reference to the flowchart illustrated in FIG. 7. The same process as that of FIG. 6 will be denoted by the same step number and the description thereof will be omitted.

After S2, the acquisition unit 10 acquires (any one or more of) the position information, the timing information, the status information, and the history information (step S2a). After S2a, S3 is executed. After S3, the output unit 13 identifies related information corresponding to a combination of objects included in the object group selected in S3, and (any one or more of) the position information, the timing information, the status information, and the history information acquired in S2a (step S4a). Subsequently, the output unit 13 outputs the related information identified in S4a (step S5). S3 can be omitted, and in that case, in S4a, the related information corresponding to a combination of the objects recognized in S2, and (any one or more of) the position information, the timing information, the status information, and the history information acquired in S2a. The timing of the process of S2a may be simultaneous with S1 and may be arbitrary as long as it is before the process of S4a.

Next, advantageous effects of the related information output apparatus 1 configured as in the present embodiment will be described.

According to the related information output apparatus 1 of the present embodiment, the recognition unit 12 recognizes one or more objects included in a captured image acquired by the acquisition unit 10, and the output unit 13 outputs related information related to the recognized objects. That is, it is possible to output related information related to objects included in a captured image.

According to the related information output apparatus 1 of the present embodiment, the output unit 13 outputs the related information based on a combination of a plurality of the objects recognized by the recognition unit 12. Due to this, it is possible to output related information more suitable to a status and an environment based on a combination of a plurality of objects.

According to the related information output apparatus 1 of the present embodiment, the output unit 13 selects an object group from the plurality of the objects recognized by the recognition unit 12 and outputs the related information based on a combination of the objects included in the selected object group. Due to this, it is possible to output related information more suitable to a status and an environment based on a combination of objects included in an object group selected intentionally.

According to the related information output apparatus 1 of the present embodiment, the output unit 13 selects the object group on the basis of an attribute of the object. Due to this, it is possible to output related information more suitable to a status and an environment based on a combination of objects included in an object group selected on the basis of an attribute of an object.

According to the related information output apparatus 1 of the present embodiment, the output unit 13 selects the object group on the basis of a distance between the objects. Due to this, it is possible to output related information more suitable to a status and an environment based on a combination of objects included in an object group selected on the basis of the distance between objects.

According to the related information output apparatus 1 of the present embodiment, the output unit 13 uses an attribute of the object instead of the object as at least a part of elements of the combination when combining objects. Due to this, it is possible to output related information based on various combinations.

According to the related information output apparatus 1 of the present embodiment, the output unit 13 outputs the related information on the basis of at least one of position information when the image capturing apparatus 1b captured the captured image acquired by the acquisition unit 10, timing information related to a time point at which the captured image was captured, status information related to a status when the captured image was captured, and the related information output in the past by the output unit 13. Due to this, it is possible to output related information more suitable to a status and an environment.

According to the related information output apparatus 1 of the present embodiment, the output unit 13 changes a timing to output the related information, the related information to be output, or a display area for displaying the related information on the basis of at least one of position information when the image capturing apparatus 1b captured the captured image acquired by the acquisition unit 10, timing information related to a time point at which the captured image was captured, the status information related to a status when the captured image was captured, and the related information output in the past by the output unit 13. Due to this, it is possible to output related information at a timing, in a content, or in a display area more suitable to a status and an environment.

According to the related information output apparatus 1 of the present embodiment, the output unit 13 calculates status information on the basis of at least one of the captured image acquired by the acquisition unit 10, the position information when the image capturing apparatus 1b captured the captured image, and the timing information related to the time point at which the captured image was captured. Due to this, it is possible to calculate status information indicating a more accurate status.

According to the related information output apparatus 1 of the present embodiment, the acquisition unit 10 acquires the captured image captured by the image capturing apparatus 1b, and the output unit 13 displays the related information so as to be superimposed on the captured image displayed to the user by the display apparatus 1c. Due to this, the user can view the related information displayed to be superimposed on the captured image displayed to the user without any special operation while wearing the smartglasses, and the user's convenience is improved.

As a problem of the conventional technique, desired information may differ depending on time and case even if the same thing is viewed on an AR device. In the related information output apparatus 1 of the present embodiment, rather than displaying single information only for a single object, a status of a user is identified on the basis of a plurality of objects or a combination with position information and necessary information is displayed. As a specific example, when a user wears the related information output apparatus 1, looks at an ingredient, and recognizes the object (for example, carrot), a recipe using a carrot is displayed if the user looks at a carrot by opening a refrigerator (object recognition) at a home (position information). On the other hand, when the user places a carrot on a chopping board (object recognition), a carrot cutting method (for example, how many centimeters or the like) is displayed in a superimposed manner as a guide according to a recipe.

Moreover, when the user picks up a carrot at a restaurant (position information), a menu using a carrot is displayed, and if there is a carrot left in a house, that information is also displayed. That is, according to the related information output apparatus 1 of the present embodiment, since the status of a user is determined and information corresponding to the status is provided as well as recognizing one object and displaying specific information, it is possible to obtain information that the user really needs.

The block diagram used in description of the embodiment illustrates functional unit blocks. These functional blocks (configuration units) are realized by an arbitrary combination of hardware and/or software. Moreover, a realization method for realizing the respective functional blocks is not particularly limited. That is, the respective functional blocks may be realized by one apparatus which is physically or logically coupled or may be realized by a plurality of apparatuses which are physically or logically separated and which are directly and/or indirectly (for example, by cables and/or wirelessly) connected. The functional blocks may be realized by combining software with one apparatus or a plurality of apparatuses.

Figure 8:
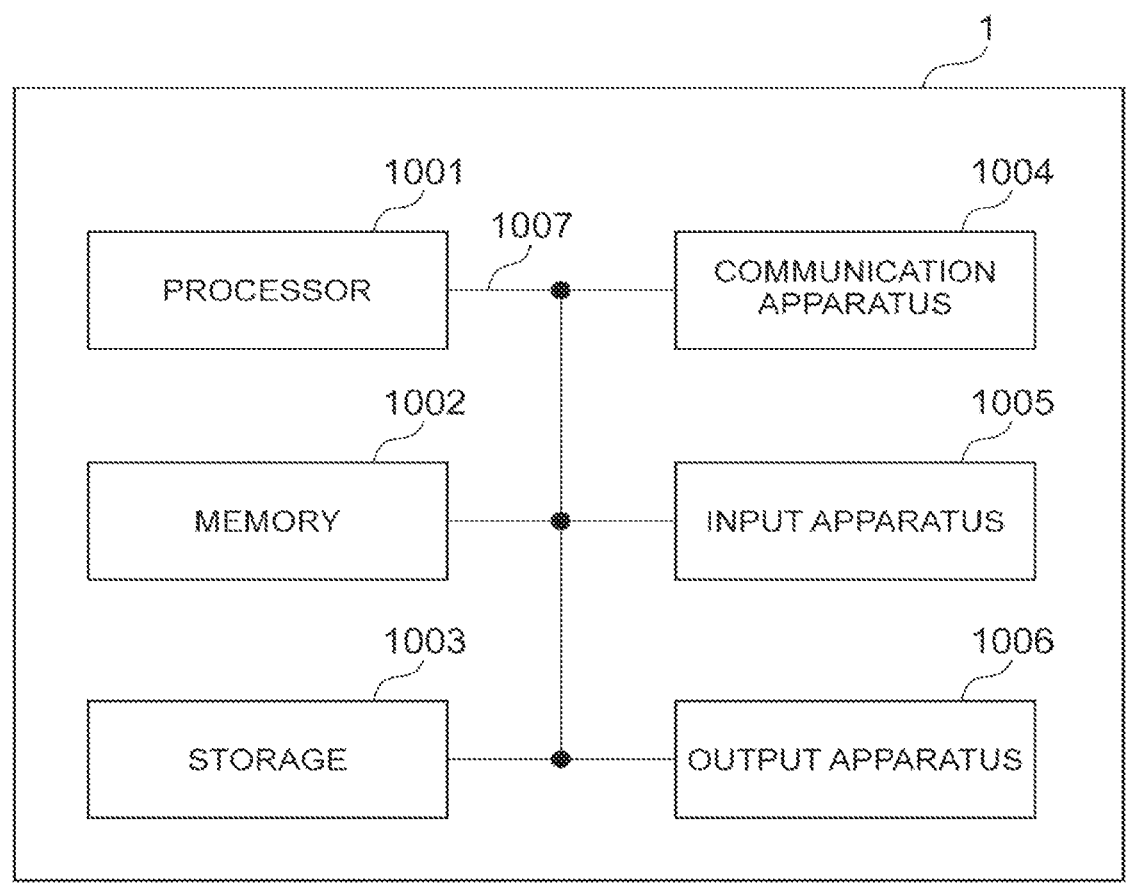
FIG. 8 is a diagram of a hardware configuration of the related information output apparatus according to the embodiment of the present invention.

For example, the related information output apparatus 1 and the like according to an embodiment of the present disclosure may function as a computer that performs a check-in determination process of the present disclosure. FIG. 8 is a diagram illustrating an example of a hardware configuration of the related information output apparatus 1 according to an embodiment of the present disclosure. The related information output apparatus 1 may be physically configured as a computer apparatus which includes a processor 1001, a memory 1002, a storage 1003, a communication apparatus 1004, an input apparatus 1005, an output apparatus 1006, a bus 1007, and the like.

In the following description, the word "apparatus" may be replaced with "circuit," "device," "unit," or the like. The hardware configuration of the related information output apparatus 1 may include one or a plurality of apparatuses illustrated in FIG. 8 and may not include some apparatuses.

The respective functions of the related information output apparatus 1 are realized when predetermined software (program) is read onto hardware such as the processor 1001, the memory 1002, and the like, the processor 1001 performs an operation, and the communication by the communication apparatus 1004 and the data read and/or written in the memory 1002 and the storage 1003 are controlled.

The processor 1001 operates an operating system to control the entire computer, for example. The processor 1001 may be configured as a central processing unit (CPU) that includes an interface to a peripheral apparatus, a control apparatus, an operation apparatus, a register, and the like. For example, the acquisition unit 10, the recognition unit 12, the output unit 13, and the like may be realized by the processor 1001.

The processor 1001 reads a program (program codes), a software module, or data from the storage 1003 and/or the communication apparatus 1004 into the memory 1002 and executes various processes according to the program and the like. A program for causing a computer to execute at least a portion of the operations described in the embodiment is used as the program. For example, the acquisition unit 10, the recognition unit 12, and the output unit 13 may be realized by a control program which is stored in the memory 1002 and operated by the processor 1001, and the other functional blocks may be realized in the same way. Although it has been described that the above-described processes are executed by one processor 1001, the processes may be executed by two or more processors 1001 simultaneously or sequentially. One or more chips may be mounted in the processor 1001. The program may be transmitted from a network via a telecommunication circuit.

The memory 1002 is a computer-readable recording medium and may be configured as at least one of a read only memory (ROM), an erasable programmable ROM (EPROM), an electrically erasable programmable ROM (EEPROM), a random access memory (RAM), and the like, for example. The memory 1002 may be referred to as a register, a cache, a main memory (main storage device), and the like. The memory 1002 can store a program (program codes), a software module, and the like that can be executed to perform a wireless communication method according to an embodiment of the present disclosure.

The storage 1003 is a computer-readable recording medium and may be configured as at least one of an optical disc such as a compact disc (CD)-ROM, a hard disk drive, a flexible disk, an optomagnetic disc (for example, a compact disc, a digital versatile disc, or a Blu-ray (registered trademark) disc), a smartcard, a flash memory (for example, a card, a stick, or a key drive), a floppy (registered trademark) disk, a magnetic strip, and the like, for example. The storage 1003 may be referred to as an auxiliary storage apparatus. The above-described storage medium may be a database and a server, and any other appropriate medium that include the memory 1002 and/or the storage 1003.

The communication apparatus 1004 is hardware (a transmission and reception apparatus) for performing communication between computers via cables and/or a wireless network and is also referred to as a network device, a network controller, a network card, a communication module, and the like, for example. For example, the acquisition unit 10, the output unit 13, and the like may be realized by the communication apparatus 1004. The acquisition unit 10 and the output unit 13 may be implemented in such a way that the units are physically or logically separated.

The input apparatus 1005 is an input device (for example, a keyboard, a mouse, a microphone, a switch, a button, a sensor, and the like) that receives the input from the outside. The output apparatus 1006 is an output apparatus (for example, a display, a speaker, an LED lamp, or the like) that outputs information to the outside. The input apparatus 1005 and the output apparatus 1006 may have an integrated configuration (for example, a touch panel).

The respective apparatuses such as the processor 1001 and the memory 1002 are connected by the bus 1007 for communicating information. The bus 1007 may be configured as a single bus and may be configured as different buses for respective apparatuses.

The related information output apparatus 1 may be configured to include hardware such as a microprocessor, a digital signal processor (DSP), an application specific integrated circuit (ASIC), a programmable logic device (PLD), a field programmable gate array (FPGA), and the like, and some or all of the respective functional blocks may be realized by the hardware. For example, the processor 1001 may be implemented by at least one of these items of hardware.

The respective aspects and embodiments described in the present disclosure may be applied to Long Term Evolution (LTE), LTE-Advanced (LTE-A), SUPER 3G, IMT-Advanced, 4th generation mobile communication system (4G), 5th generation mobile communication system (5G), Future Radio Access (FRA), new radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system which uses other appropriate systems, and/or a next-generation system which is extended on the basis of these systems. Moreover, the respective aspects and embodiments described in the present disclosure may be applied to combinations of a plurality of systems (a combination of at least one of LTE and LTE-A and 5G).

The orders in the processing procedures, the sequences, the flowcharts, and the like described in the respective aspects and embodiments described in the present disclosure may be switched unless contradiction occurs. For example, in the method described in the present disclosure, although various steps are illustrated in an exemplary order, the steps are not limited to the illustrated specific order.

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (true or false), and may be made by comparison of numerical values (comparison with a predetermined value, for example).

The respective aspects and embodiments described in the present disclosure may be used solely, may be used in combination, and may be switched and used according to execution. Moreover, the notification (notification of "X," for example) of predetermined information is not limited to being performed explicitly but may be performed implicitly (for example, without performing the notification of the predetermined information).

While the present disclosure has been described above in detail, it is obvious to those skilled in the art that the present disclosure is not limited only to the embodiment described in the present disclosure.

The present disclosure can also be embodied in other modified and altered forms without departing from the gist and scope of the present disclosure as defined by description in the appended claims. It is therefore to be understood that the disclosure of the present disclosure is intended for the purpose of description and exemplification but is not intended to limit the scope of the present disclosure.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language or other names.

Furthermore, software, instructions, information, and the like, may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared rays, and microwave, these wired and/or wireless technologies are included within the definition of the transmission medium.

Information, signals, and the like described in the present disclosure may be represented using any of various different other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The terms described in the present disclosure and/or the terms necessary for understanding of the present disclosure may be replaced with terms having the same or similar meaning.

The terms "system" and "network" as used in the present disclosure are used interchangeably.

Furthermore, the information, parameters, and the like described in the present disclosure may be represented by absolute values, may be represented as relative values from predetermined values, or may be represented by any other corresponding information. For example, wireless resources may be indicated by indices.

The names used for the above-described parameters are not limiting names in any respect. Furthermore, numerical formulae using these parameters may be different from those explicitly disclosed in the present disclosure.

The terms "determine (determining)" and "decide (determining)" used in the present disclosure may include various types of operations. For example, "determining" and "deciding" may include considering that a result of judging, calculating, computing, processing, deriving, investigating, looking up (search or inquiry) (for example, search in a table, a database, or another data structure), or ascertaining is "determined" or "decided". Furthermore, "determining" and "deciding" may include, for example, considering that a result of receiving (for example, reception of information), transmitting (for example, transmission of information), inputting, outputting, or accessing (for example, accessing data in memory) is "determined" or "decided". Furthermore, "determining" and "deciding" may include considering that a result of resolving, selecting, choosing, establishing, or comparing is "determined" or "decided".

That is, "determining" and "deciding" may include considering that a certain operation is "determined" or "decided". Moreover, "determining (deciding)" may be replaced with "assuming," "expecting," "considering," and the like.

The terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be replaced with "access". As used in the present disclosure, when two elements are connected, these elements may be considered "connected" or "coupled" to each other using one or more electrical wires, cables and/or printed electrical connections, and, as a number of non-limiting and non-inclusive examples, for example, using electromagnetic energy having wavelengths in the radio frequency, microwave and optical (both visible and invisible) regions.

The expression "on the basis of" used in the present disclosure does not mean "on the basis of only" unless particularly stated otherwise. In other words, the expression "on the basis of" means both "on the basis of only" and "on the basis of at least".

Any reference to elements using names, such as "first" and "second," as used in the present specification does not generally limit the amount or order of those elements. These names can be used in the present specification as a convenient way to distinguish between two or more elements. Therefore, the reference to the first and second elements does not imply that only two elements can be adopted, or that the first element must precede the second element in some way.

As long as "include," "including," and variations thereof are used in the present specification or the claims, these terms are intended to be inclusive in a manner similar to the expression "comprising."

Furthermore, the expression "or" used in the specification or claims is not intended to mean an exclusive logical sum.

In the present disclosure, when English articles such as a, an, and the are added to an element in the translated English text, for example, such an element to which these articles are added may be provided plurally.

REFERENCE SIGNS LIST

1 Related information output apparatus
1a Main apparatus
1b Image capturing apparatus
1c Display apparatus
10 Acquisition unit
11 History storage unit
12 Recognition unit
13 Output unit
14 Correlation table storage unit

The invention claimed is:

1. A related information output apparatus comprising:
processing circuitry configured to
acquire a captured image;
recognize one or more objects comprised in the acquired captured image; and
output related information related to the recognized objects,
wherein
the processing circuitry outputs the related information based on a combination of a plurality of the recognized objects, and
the processing circuitry selects an object group from the plurality of the recognized objects on the basis of a distance between the objects and outputs the related information based on a combination of the objects comprised in the selected object group.

2. The related information output apparatus according to claim 1, wherein
the processing circuitry uses an attribute of the object instead of the object as at least a part of elements of the combination.

3. The related information output apparatus according to claim 1, wherein
the processing circuitry outputs the related information on the basis of at least one of position information when an image capturing apparatus captured the acquired captured image, timing information related to a time point at which the captured image was captured, status information related to a status when the captured image was captured, and the related information output in the past.

4. The related information output apparatus according to claim 1, wherein
the processing circuitry changes a timing to output the related information, the related information to be output, or a display area for displaying the related information on the basis of at least one of position information when an image capturing apparatus captured the acquired captured image, timing information related to a time point at which the captured image was captured, status information related to a status when the captured image was captured, and the related information output in the past.

5. The related information output apparatus according to claim 3, wherein
the processing circuitry calculates status information on the basis of at least one of the acquired captured image, the position information when the image capturing apparatus captured the captured image, and the timing information related to the time point at which the captured image was captured.

6. The related information output apparatus according to claim 1, further comprising:
an image capturing apparatus that captures the surroundings of a user; and
a display apparatus that displays the captured image captured by the image capturing apparatus to the user, wherein
the processing circuitry acquires the captured image captured by the image capturing apparatus, and
the processing circuitry displays the related information so as to be superimposed on the captured image displayed to the user by the display apparatus.

7. A method, implemented by processing circuitry of a related information output apparatus, comprising:
acquiring a captured image;
recognizing one or more objects comprised in the acquired captured image; and
outputting related information related to the recognized objects,
wherein the method further includes
outputting the related information based on a combination of a plurality of the recognized objects, and
selecting an object group from the plurality of the recognized objects on the basis of a distance between the objects and outputting the related information based on a combination of the objects comprised in the selected object group.

* * * * *